United States Patent
Kreutzer

[11] 3,712,491
[45] Jan. 23, 1973

[54] DUAL PURPOSE DUMP AND TRANSPORT VEHICLE

[75] Inventor: Thomas F. Kreutzer, Yonkers, N.Y.
[73] Assignee: L. S. T. Enterprises, Bronx, N.Y.
[22] Filed: Oct. 18, 1971
[21] Appl. No.: 189,968

[52] U.S. Cl. .................214/505, 214/517, 214/85.1
[51] Int. Cl. ..............................................B60p 1/28
[58] Field of Search.......214/501, 505, 85, 85.1, 517, 214/506; 298/23 R, 23 MD, 23 S

[56] References Cited

UNITED STATES PATENTS

| | | | |
|---|---|---|---|
| 2,812,088 | 11/1957 | Cadillac et al. | 214/505 |
| 3,430,792 | 3/1969 | Grove et al. | 214/505 |

*Primary Examiner*—Albert J. Makay

[57] ABSTRACT

A dump and transport vehicle having a tiltable platform with a hinged tail gate having ramp means positioned on the underside thereof and mechanical means for securing a storage container to the upper, inner side thereof. Hydraulic means are provided to tilt the platform upwardly at the front end thereof and for moving the tail gate from its closed position to open positions including a fully open position in which the tail gate forms a planar extension of the platform. With the storage container secured to the tail gate and said gate extended to its fully open position reaching to the ground, with the ramp means in a retracted position, dumping of material from the storage container is facilitated. With the ramp means in its extended position extending from the fully open tail gate and reaching to the ground, the angle of inclination of said ramp means, tail gate and tilted platform is minimized, facilitating the loading and unloading of objects to be transported on said vehicle. The tail gate and the ramp means are provided with openings through which locking pins on the storage container are placed, the openings in the ramp means being key-shaped to permit the ramp means to be moved to a lock position in which said locking pins are precluded from passing back through said openings, thus securing said storage container to the tail gate for convenient movement to dumping and loading positions. By moving the ramp means to an unlock position, the storage container can be moved on the platform so as to remove the locking pins from the ramp means and the tail gate, permitting the ramp means to be moved to its extended position forming an extension of the tail gate, permitting the platform to be lowered to a lower position facilitating loading and unloading of said storage container or other objects to be transported on the vehicle.

19 Claims, 12 Drawing Figures

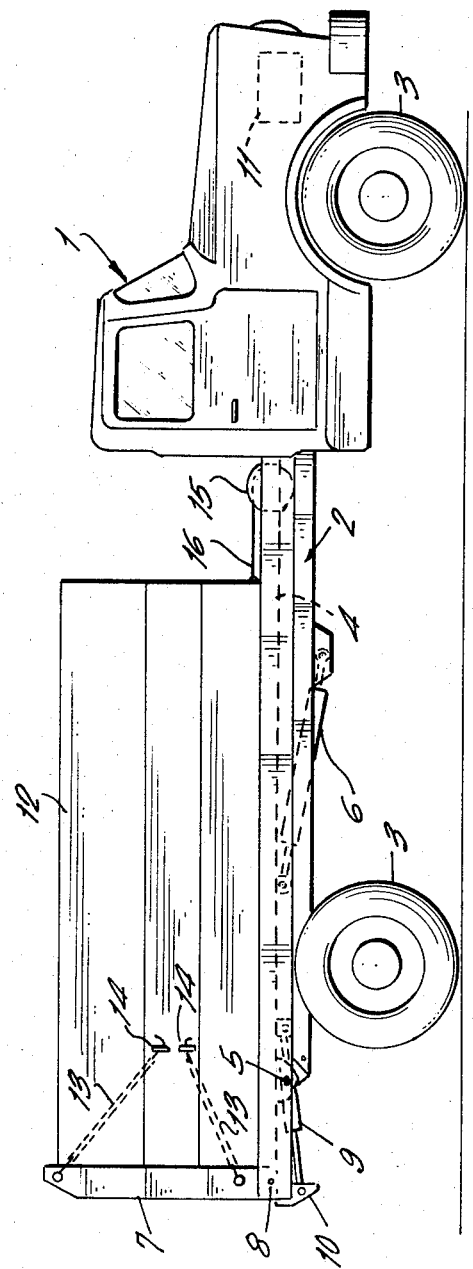
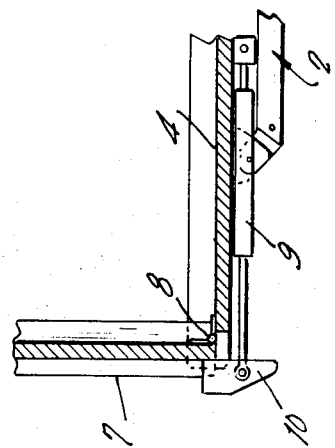
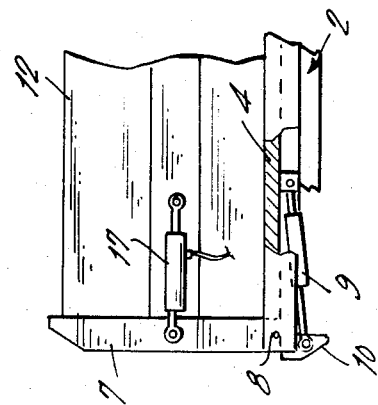

INVENTOR.
THOMAS F. KREUTZER

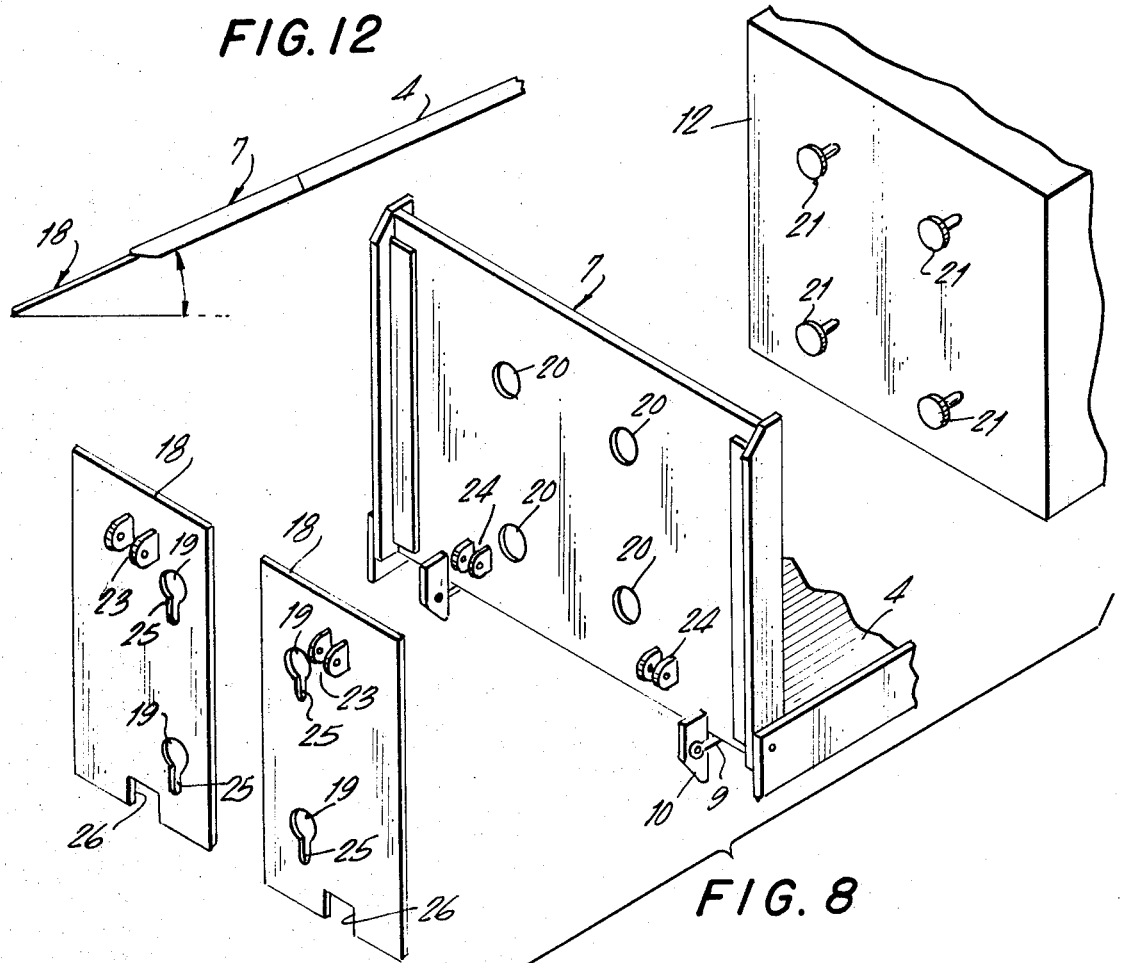
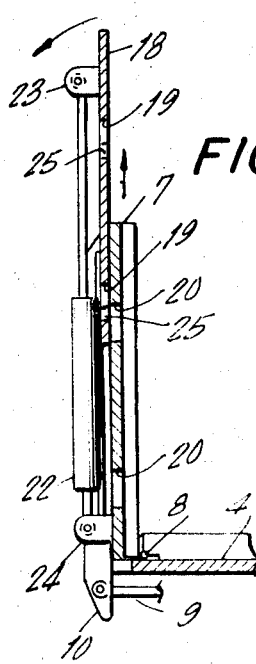
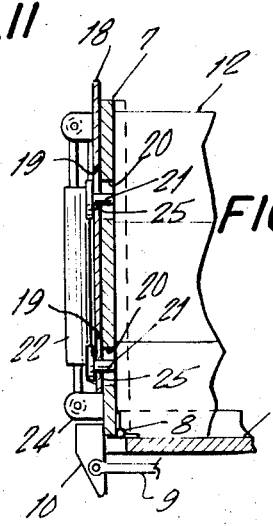
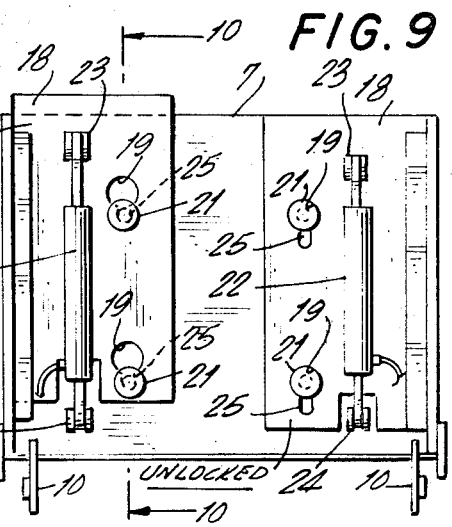

DUAL PURPOSE DUMP AND TRANSPORT VEHICLE

BACKGROUND OF THE INVENTION

1. Field of the Invention

This invention relates to an improved vehicle. More particularly, it relates to a transport vehicle having load dumping means conveniently associated therewith.

2. Description of the Prior Art

The transportation of objects from place to place by means of transport vehicles such as trucks is vital to almost all forms of commercial activity. Trucks are continually being designed to facilitate the loading, unloading, transport and other handling of objects to be moved from one location to another. Many truck designs have related to trucks having tiltable platforms and tail gates that can be dropped to form an entrance ramp so as to enable cars, tractors or other objects to be moved onto the platform for transport. One such system is shown in the Schwartz patent, U.S. Pat. No. 3,066,816 in which an additional approach plate serves also as a vehicle bumper.

In some instances, the object to be moved is a storable container positioned on the platform of the transport vehicle and intended to be loaded with dumpable material, e.g. sand, at one location for unloading or dumping at another location. After dumping, the container may be transported back to the first location to receive an additional load. Advantageously, a transport vehicle should have means to facilitate the loading and unloading of the dumpable material without removing the storage container from the transport vehicle.

In the transport field, in which greater convenience and ease of operation and lesser manual effort are always desired and necessary to assure economic feasibility, a genuine need exists for a transport vehicle having convenient means but for loading and unloading objects to be transported and for dumping materials from storable containers positioned on the vehicle as the object to be transported.

This need includes vehicles in which these functions are combined to minimize overall cost and assure maximum effeciency in a dual purpose dump and transport vehicle.

It is an object of the invention, therefore, to provide an improved transport vehicle.

It is another object to provide a dual purpose dump and transport vehicle.

It is a further object to provide a means for loading and unloading objects from a transport vehicle, said means also serving to facilitate the dumping of material from a storable object without removing the object from the vehicle.

With these and other objects in mind, the invention is hereinafter describes in detail, the novel features thereof being pointed out in the appended claims.

SUMMARY OF THE INVENTION

The objects of the invention are accomplished by a dual purpose dump and transport vehicle having a tiltable platform and a movable tail gate having means to secure a storage container thereto for ease of dumping with the tail gate in its fully open position at a maximum angle of inclination to the ground. Ramp means are positioned at the underside of the tail gate and can be moved to an extended position in which said ramp means forms an extension of the tail gate. Reaching the ground level in this position, the ramp means minimizes the angle of inclination of the tail gate and the platform for ease of loading and unloading objects to be transported. When said object is a storage container, the container may be secured to the tail gate for ease of dumping by moving the ramp means from its retracted unlock position under the tail gate to a lock position in which locking pins secured to the container and passing through openings in the tail gate and said ramp means are precluded from passing back through said openings, hydraulic means are provided to lift the platform, to move the tail gate to its open position, and to move the ramp means from its retracted unlock position to either its retracted lock position to secure a storable container or other object to the tail gate or to its fully extended position to facilitate loading or unloading of objects to be transported.

BRIEF DESCRIPTION OF THE DRAWINGS

The invention is further described with reference to the accompanying drawings in which:

FIG. 1 is a side view of the dual purpose dump and transport vehicle of the invention with an object to be moved positioned thereon, mechanical chain means being provided to secure said object to the tail gate;

FIG. 2 is a partial side view of the vehicle of FIG. 1 showing the hydraulic means for moving the tail gate between open and closed positions and hydraulic means for securing the object to be moved to the tail gate;

FIG. 3 is a partial side view, partly in cross-section, showing the tail gate in its closed position with hydraulic means for controlling the movement of said tail gate being secured to the underside of the tiltable platform;

FIG. 4 is a partial side view, partly in cross-section, showing the tail gate moved to its fully open position forming a generally planar extension of the tail gate;

FIG. 8 is a perspective view showing in separated positions the tail gate having openings therein through which the locking pins shown on the storage container can be passed, the ramp members shown having key-shaped openings facilitating movement of the ramp members between lock and unlock positions;

FIG. 9 is a rear elevation view showing the tail gate of the invention having ramp members positioned thereon with hydraulic means for movement thereof, one ramp member shown in its retracted unlock position and the other in its lock position;

FIG. 10 is a side elevational view, partly in cross-section, showing the ramp means in a lock position;

FIG. 11 is a side elevational view, partly in cross-section, showing the ramp means in its extended position forming an extension of the tail gate; and FIG. 12 is a partial elevational view showing the tail gate in a fully open position extending from the elevated platform, with the ramp means extended so as to reach ground level, minimizing the angle of inclination to facilitate loading and unloading of the vehicle.

DETAILED DESCRIPTION OF THE INVENTION

Figure 5:
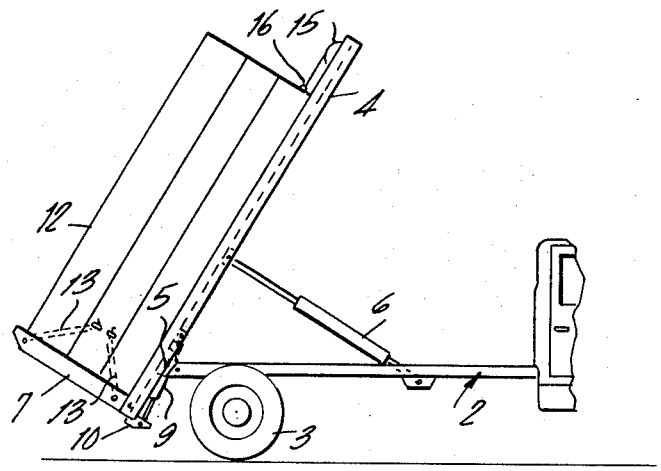
FIG. 5 is a side elevational view of the vehicle of the invention with the tiltable bed at an elevated position so that the storage container thereon is supported by the tail gate in its closed position.

Referring to FIG. 1, Numeral 1 represents the truck cab of the dual purpose dump and transport vehicle of the invention having frame 2 and wheels 3. Tiltable platform 4 is pivotally mounted at pivot 5 at the rear portion thereof hydraulic piston cyclinders 6, only one of which is shown, are provided to tilt platform 4 from its lowered, generally horizontal position on said frame to elevated tilted positions in which said platform extends upward toward the front portion of the vehicle and downward toward the back portion thereof.

Figure 6:
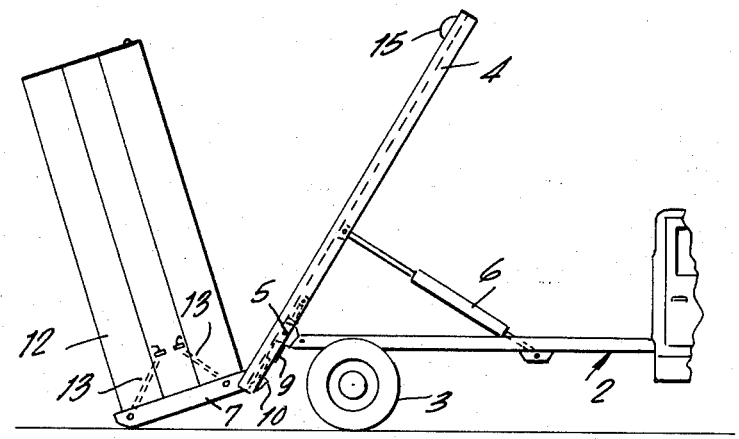
FIG. 6 is a side elevational view of the vehicle of FIG. 5 with its tail gate in an open position reaching to ground level.
Figure 7:
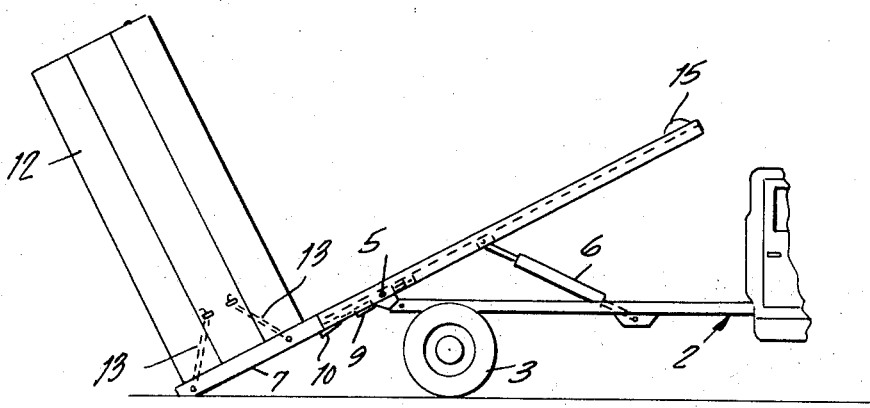
FIG. 7 is a side elevational view of the vehicle of FIGS. 5 and 6 with its platform lowered and its tail gate moved to a fully open position reaching to ground level, maximizing the angle of dumping from the container secured to the tail gate.

Tail gate 7 is shown in FIG. 1 in a closed position in which the tail gate extends upward from said platform in a generally normal relation with respect to said platform 4. Tail gate 7 has hinge 8 at the bottom thereof for movement of said gate to open positions in which tail gate 7 extends upward and rearwardly from platform 4 at an angle less than said normal relation, as shown in FIG. 6. In its fully open position, tail gate 7 forms a generally planar extension 4, as shown in FIG. 7, hydraulic means 9, i.e., hydraulic piston-cylinder units, secured to the underside of platform 4, controls the movement of tail gate 7 between its closed and its open positions through pivotal connection member 10 at the bottom of tail gate 7 and connected to the piston unit of hydraulic piston-cyclinder units 9. Under the hood of cab 1, engine driven pump 11 is provided for controlling the operation of hydraulic cycliners 6 and 9, and other hydraulic means hereinafter disclosed. It should be noted that hydraulic cylinder means 6 controlling the movement of platform 4 are secured to vehicle frame 2.

Object 12 to be transported is shown positioned of platform 4 and secured to tail gate 7 by means of retaining chains 13 connected to connection points 14 on said object 12. Winch 15 and cable 16 at the front end of platform 4 are provided to facilitate the pulling of object 12 onto the vehicle, particularly when platform 4 and its extensions are positioned as shown in FIG. 12.

In FIG. 2, hydraulic lock cyclinder unit 17 is shown secured to tail gate 7 and adapted to draw container 12 securely to said tail gate 7 by engagement of the piston end of said hydraulic cyclinders 17 with locking pins at the sides of object 12.

In FIG. 8, tail gate 7 is shown together with ramp means in the form of two separate ramp members 18 to be positioned on the outer, underside of tail gate 7 and object 12 to be transported. Object 12 has locking pins 21 having a body portion secured to the side of object 12 and an enlarged head portion shown, for illustrative purposes, in cylindrical form tail gate 7 has openings 20 therein in alignment with the locking pins 21 on object 12. Said openings 20 are of sufficient size and shape to permit the locking pins 21 to pass therethrough.

Ramp members 18 have key-shaped openings 19 therein having an enlarged portion corresponding in size and shape to openings 20 in tail gate 7 the enlarged portion of opening 19 is thus adapted to permit locking pins 21 to pass therethrough when said enlarged portion of opening 19 is in alignment with the corresponding opening 20 in tail gate 7. Openings 19 also have slot portion 25 extending therefrom and adapted to permit the passage therethrough of the body portion of locking pins 21, but of insufficient size to permit the enlarged head portion to pass therethrough.

As further shown in FIG. 8, hydraulic cylinder mounting members 24 are positioned on opposite sides of tail gate 7 for mounting hydraulic cyclinders 22 for controlling the movement of ramp members 18, which have mounting members 23 for securing the opposite piston ends of hydraulic units 22. Members 18 also have cut out portions 26 in position to accommodate mounting members 24 extending from the underside of tail gate 7.

With the ramp members 18 positioned on the underside of tail gate 7 as shown in FIG. 9, the enlarged portion of openings 19 on ramp 18 are in alignment with openings 20 on tail gate 7 when said ramp members 18 are in the retracted, unlock position. This position is shown for comparative illustrative purposes by the right ramp member 18 only in FIG. 9. The left ramp member 18 is shown in its lock position in which the enlarged portion of ramp openings 19 are moved out of alignment with tail gate openings 20. In this lock position, the enlarged head portion of locking pins 21 passed through openings 20 and 19 when ramp members 18 are in their retracted unlock position are precluded from passing back through said openings, thus securing container 12 to the inner, upper side of tail gate 7. It will be appreciated that the slot portion 25 of the openings in ramp members 18 are positioned so as to permit the body portion of locking pins 21 to slide therein as said ramp members are moved between their unlock and lock positions. It will also be appreciated that the lock position of the ramp members 18 is generally, for convenience, under tail gate 7 but displaced in the front-rear longitudinal direction from said retracted unlock position with respect to the tail gate. While said displacement to the lock position can be in either direction, the lock position of ramp members 18 is conveniently positioned intermediate said unlock position and fully extended positions of the ramp members.

In the lock position of ramp means 18 as shown in FIG. 10, said ramp means is shown in the indicated intermediate position with the outer end thereof extending slightly beyond the end of tail gate 7. In FIG. 11, hydraulic cylinder 22 for moving ramp means 18 is activated to move ramp means 18 to its fully extended position in which the ramp members form an extension of tail gate 7. It should be noted that movement of ramp members 18 to their extended position occurs with locking pins removed from the openings in the ramp members and the tail gate. Movement of the ramp means between its extended position and its retracted, unlock position occurs when the ramp is employed for facilitating loading and unloading of the dual purpose dump and transport vehicle, and movement between its retracted, unlock position and the lock position occurs for the purpose of facilitating the locking of a container on platform 4 to the inner, upper side of tail gate 7.

As shown in FIG. 12, platform 4 can be elevated, tail gate 7 lowered to its fully open position, and ramp members 18 can be moved to its fully extended position reaching to ground level. In this position, the angle of inclination or elevation of the platform and its extensions can be minimized so as to facilitate the loading and unloading of objects to be transported. When the object is a storage container, other positions are desirable for dumping material from the container without removing said container from the dump and transport vehicle of the invention. For this purpose, the container is secured to the tail gate, either by means of chains, hydraulic locking mechanisms for drawing the container to the tail gate, or any other appropriate means. In the preferred embodiment discussed above, locking pins on the storage container are passed through openings in the tail gate and through the enlarged portion of the opening in the ramp members while the ramp members are positioned in the retracted, unlock position. The ramp members are then moved to the lock position in which the enlarged portions of the openings therein are out of alignment with the openings in the tail gate, precluding the movement of the locking pins back through the openings in the ramp members and tail gate.

With the container thus secured to the tail gate, platform 4 is tilted to a much higher position than that desired for unloading and loading as shown in FIG. 12. In the highly elevated position, as shown in FIG. 5, the storable container rests on the tail gate that is in its closed position. Hydraulic means 9 is then employed to move tail gate 7 to an open position, as with said gate touching the ground. In this position, shown in FIG. 6, storage container 12 is positioned on the lowered tail gate to which it is secured and is off of the surface of platform 4. In this position, dumpable material can flow from the top of storable container 12. In order to enhance the angle of dumping, facilitating full dumping of flowable or dumpable materials from storage container 12, the elevation of platform 4 can be lowered and the tail gate consequently moved to a fully open position as shown in FIG. 7. In this position, storage container 12 is positioned at an extreme dumping angle facilitating the flow of material therefrom. The tail gate can thereafter be moved to the closed position and the platform lowered to its generally horizontal position for transport by said dual purpose vehicle to the original loading position or other desired location.

In order to remove the storable container from the transport vehicle, the ramp members are moved from the lock position to the unlock position so that the container can be moved forward on the platform, as by winch and cable, removing the locking pins from their position passing through the openings in said ramp members and the tail gate. The platform can then be raised, the tail gate lowered, and the ramp members extended to reach ground level so that unloading of the container can be facilitated. The container, of course, can be an object other than a storage container, the preferred locking means serving to provide convenient and secure locking of the object to be transported to the tail gate. When a storage container is employed, material other than deadly flowable or, dumpable material can be loaded and dumped therefrom.

While the invention has been described with reference to various embodiments thereof, it will be appreciated that various changes and modifications can be made without departing of the scope of the invention as set forth in the appended claims.

Therefore, I claim:

1. A dual purpose dump and transport vehicle comprising:
   a. A vehicle frame:
   b. A tiltable platform pivotally mounted on the rear portion of said frame and adapted for movement between a lowered, generally horizontal position on said frame and elevated tilted positions in which said platform extends upward toward the front portion of the vehicle and downward toward the back portion thereof:
   c. First hydraulic mechanical means for moving said platform between said lowered position and said elevated tilted positions:
   d. A tail gate mounted at the rear end of said platform for movement between a closed position in which said tail gate extends upward from said platform in a generally normal relation with respect thereto and open positions in which said tail gate extends upward and rearwardly from said platform at an angle less than said normal relation, in its fully open position said tail gate forming a generally planar extension of said platform, said tail gate having openings therein adapted to permit the passage therethrough of the enlarged head portion of locking pins;
   e. Second hydraulic mechanical means for moving said tail gate between its closed position and its open positions:
   f. Ramp means positioned on the outer, underside of said tail gate and adapted for movement between a retracted unlock position generally under said tail gate, a lock position in which said ramp means is likewise positioned generally under said tail gate but displaced in the front-rear longitudinal direction from said unlock position with respect to said tail gate, and an extended position in which said ramp means forms an extension of said tail gate, said ramp means having key-shaped openings therein with an enlarged portion and a slot portion extending therefrom, said enlarged portion of the openings adapted to permit the passage therethrough of the enlarged head portion of locking pins, said slot portion of the openings adapted to permit the passage therethrough of the body portion of locking pins but of insufficient size to permit the enlarged head portion to pass therethrough, the enlarged portion of the ramp means openings being aligned with the openings in said tail gate when said ramp means is positioned in its retracted, unlock position said enlarged portion of the ramp means openings being out of alignment with the tail gate openings so as to preclude the passage of the enlarged head portion of locking pins through said openings when said ramp means is in said lock position, said slot portion of the openings positioned so as to permit the body portion of locking pins to slide therein as said ramp means moves between its unlock and lock positions; and g. Third hydraulic mechanical means for moving said ramp means between said retracted unlock position, said retracted lock position and said extended position, whereby the vehicle platform can be tilted to an elevated position and the tail gate lowered to an open position for loading and unloading of the vehicle with the object to be transported, the extension of said ramp means to an extended position in contact with the ground minimizing the angle of elevation of the ramp, tail gate and platform combination with respect to the ground to facilitate said loading and unloading, dumping being facilitated when said object being transported is a storage container having locking pins thereon by passage through the openings in said tail gate and ramp means when said ramp means is in an unlock position, thereafter moving said ramp means to a lock position, thus securing the storage container to the tail gate, the platform being elevated to a high position and the tail gate being opened so the end thereof reaches ground level permitting material to be dumped from the top of the container, the angle of dumping being increased by lowering the angle of elevation of the platform to permit the tail gate to be moved to its fully open position, thus maximizing the angle of dumping of the container resting on the tail gate and assuring the desired flow of material from the container.

2. The apparatus of claim 1 in which said ramp means in the lock position is positioned intermediate said unlock and said extended positions thereof.

3. The apparatus of claim 2 in which said lock position of the ramp means is in proximity to said unlock position, the ramp means extending slightly beyond the outer end of the tail gate while in said lock position.

4. The apparatus of claim 3 in which said ramp means comprises two ramp members positioned so as to permit a wheeled vehicle to be moved thereup onto said tail gate and said platform and to be lowered thereon to the ground.

5. The apparatus of claim 4 in which said openings in the tail gate are positioned so as to be in alignment with the enlarged portion of the openings in both ramp members when said ramp members are in a retracted, unlock position.

6. The apparatus of claim 5 in which said first, second, and third hydraulic mechanical means comprise hydraulic piston-cylinder means, said third piston-cyclinder means comprising two units each affixed to said tail gate and adapted to move one of said ramp members, said first hydraulic means being affixed to said vehicle frame and said second hydraulic means being affixed to the underside of said platform.

7. The apparatus of claim 6 and including mechanical means for drawing an object to be transported up said tail gate and onto said platform.

8. The apparatus of claim 1 and including a storage container positioned on said platform while in its lowered position, said container having locking pins with a body portion secured to said container and an enlarged lead portion adapted to pass through the openings in said tail gate and said enlarged portion of the openings in said ramp means when said ramp means is in its retracted unlock position, said container being secured to said tail gate when the ramp means is moved to its lock position.

9. The apparatus of claim 6 and including a storage container positioned on said platform while in its lowered position, said container having locking pins with a body portion secured to said container and an enlarged head portion adapted to pass through the openings in said tail gate, and said enlarged portion of the openings in each of said ramp members when said ramp means are in their retracted unlock position, said container being secured to said tail gate when said ramp members are moved to their lock position.

10. A dual purpose dump and transport vehicle comprising:
a. A vehicle frame;
b. A tiltable platform pivotally mounted on the rear portion of said frame and adapted for movement between a lowered, generally horizontal position on said frame and elevated tilted positions in which said platform extends upward toward the front portion of the vehicle and downward toward the back portion thereof;
c. First hydraulic mechanical means for moving said platform between said lowered position and said elevated tilted positions;
d. A tail gate hingedly mounted at the rear end of said platform for movement between a closed position in which said tail gate extends upward from said platform in a generally normal relation with respect thereto and open positions in which said tail gate extends upward and rearwardly from said platform at an angle less than said normal relation, in its fully open position said tail gate forming a generally planar extension of said platform;
e. Mechanical means for securing a storage container to be carried on said platform to the inner, upper side of said tail gate for movement from said platform as said tail gate moves from its closed position to its open positions;
f. Second hydraulic mechanical means for moving said tail gate between its closed position and its open positions; and
g. Ramp means positioned on the outer, underside of said tail gate and adapted for movement between a retracted position generally under said tail gate and extended positions in which said ramp forms an extension of said tail gate, whereby the vehicle platform can be tilted to an elevated position and the tail gate lowered to an open position for loading and unloading of the vehicle with the object to be transported, the extension of the ramp means to an extended position in contact with the ground minimizing the angle of elevation of the ramp, tail gate and platform combination with respect to the ground to facilitate said loading and unloading, dumping being facilitated when said object to be transported is a storage container for dumpable material by elevating the platform to a high position, opening said tail gate with said ramp retracted to the end thereof reaches ground level so as to permit material to be dumped from the top of the container, the angle of dumping of said container capable of being increased by lowering the angle of elevation of the platform so as to permit the tail gate to be opened to its fully open position with the ramp members retracted, thereby maximizing the angle of dumping of the container resting upon said open tail gate and assuring the desired flow of material from the container.

11. The apparatus of claim 10 and including third hydraulic mechanical means for moving said ramp means between said retracted and extended positions.

12. The apparatus of claim 11 in which said ramp means comprises two ramp members positioned so as to permit a wheeled vehicle to be moved thereup onto said tail gate and said platform and to be lowered thereon to the ground.

13. The apparatus of claim 10 in which said first and second hydraulic mechanical means comprises hydraulic piston-cylinder means.

14. The apparatus of claim 13 in which said first hydraulic piston-cylinder means are affixed to said frame and said second hydraulic piston-cylinder means are affixed to the underside of said platform.

15. The apparatus of claim 14 and including third hydraulic mechanical means adapted to move said ramp members between said retracted and extended positions, said third hydraulic means being affixed to said tail gate.

16. The apparatus of claim 15 and including mechanical means for drawing an object to be transported up said tail gate and onto said platform.

17. The apparatus of claim 16 in which said mechanical means for drawing an object onto said platform comprises a winch and cable, said winch positioned at the front end of the platform.

18. The apparatus of claim 10 in which said means for securing a storage container to the tail gate comprises chain means secured to said tail gate.

19. The apparatus of claim 10 in which said means for securing a storage container to the tail gate comprises hydraulic mechanical means affixed to said tail gate and adapted to engage locking pins on the storable container.

* * * * *